United States Patent [19]

Mori et al.

[11] Patent Number: 4,908,837
[45] Date of Patent: Mar. 13, 1990

[54] RECEIVER FOR SPREAD SPECTRUM COMMUNICATION

[75] Inventors: Masaharu Mori; Masahiro Hamatsu; Shigeo Akazawa, all of Tokyo, Japan

[73] Assignee: Clarion Co., Ltd., Tokyo, Japan

[21] Appl. No.: 225,398

[22] Filed: Jul. 28, 1988

[30] Foreign Application Priority Data

Aug. 4, 1987 [JP] Japan ................. 62-196042

[51] Int. Cl.⁴ .............................................. H04K 1/02
[52] U.S. Cl. ........................................................ 375/1
[58] Field of Search ................................ 375/1; 380/34

[56] References Cited

U.S. PATENT DOCUMENTS

| | | | |
|---|---|---|---|
| 4,485,477 | 11/1984 | Nossen | 375/1 |
| 4,530,103 | 7/1985 | Mosley, Jr. et al. | 375/1 |
| 4,621,365 | 11/1986 | Chiu | 375/1 |
| 4,653,069 | 3/1987 | Roeder | 375/1 |
| 4,675,839 | 6/1987 | Kerr | 364/821 |
| 4,691,326 | 9/1987 | Tsuchiya | 375/1 |
| 4,707,839 | 11/1987 | Andren et al. | 375/1 |

Primary Examiner—Salvatore Cangialosi
Attorney, Agent, or Firm—Flynn, Thiel, Boutell & Tanis

[57] ABSTRACT

A receiver for spread spectrum communication is disclosed, which is provided with two convolvers and in which a first and a second reference signal, each of which consists of a 4-phase-modulated signal formed on the basis of a first PN code, a second PN code and a first CW signal, are supplied to a second input of each of the convolvers, respectively, while a received signal is supplied to a first input of each of the convolvers so that the correlation output of each of the convolvers is decoded so as to obtain an information signal.

13 Claims, 5 Drawing Sheets

RECEIVER FOR SPREAD SPECTRUM COMMUNICATION

FIELD OF THE INVENTION

This invention relates to a receiver for spread spectrum communication and in particular to the improvement of a convolver system used therein.

BACKGROUND OF THE INVENTION

The spread spectrum communication (hereinbelow abbreviated to SSC) is suitable for wireless data communication owing to its features such as the anti-disturbance, the secrecy, the toughness against multipath fading, etc.

According to the direct spread (hereinbelow abbreviated to DS) method among various SSC method, the transmitter transmits spread spectrum signals obtained by multiplying information signals to be transmitted with a PN code. The receiver is so constructed that received signals are correlated with the reference PN code provided with the receiver and that the correlation output is decoded so as to obtain information signals. Here, as means for correlating therebetween although there is known a correlating method using a mixer and a low path filter, or filter having a fixed weight, a convolver used as a correlator has a merit that the synchronization is effected with a high speed and that the PN code used therein is not fixed as for the matched filter, but it can be selected freely. A convolver used as a correlator in a receiver for SSC is disclosed, for example, in an article by J. H. Cafarella published in 1984 IEEE Ultrasonics Symposium Proceedings, pp. 121~26.

FIG. 7 shows the basic construction thereof, in which reference numerals 1 and 2 are gates; 3 is a convolver; 4 is a hybrid; IDT1 and IDT2 are input transducers, to which a received signal S and a reference signal R are supplied, respectively. This convolver 3 has a so-called double gate structure, in which two gates 1 and 2 are disposed on the propagation path of surface acoustic wave (hereinbelow abbreviated to SAW) so that two convolution outputs are obtained. The two convolution outputs are inputted to the hybrid 4, which is constructed so as to obtain an output $O_1$ representing the sum of the two convolution outputs and another output $O_2$ representing the difference therebetween. This construction is called a DPSK convolver. DPSK means the differential phase shift keying and according to the DPSK on the transmitter side, an information signals is DPSK-encoded and a spread-spectrum (hereinbelow abbreviated to SS)-encoded signal on the receiver side, is correlated with the reference signal by means of a DPSK convolver and thus it can be DPSK-decoded.

A parameter called BT product is used as an index representing characteristics of the convolver. B indicates the band width of the convolver and T is a delay time corresponding to the gate length. The BT product is a value obtained by multiplying these two values and the greater it is, the better it is. B is limited principally by the design of the two transducers IDT1 and IDT2 and the material of the SAW element. In order to make the BT product greater, T may be enlarged. However, when T is too large, the length of the SAW element is too great and further the longer it is, the more difficult the fabrication is and the higher the cost is. In FIG. 7, if L is restricted, the length of the gate 1 and that of the gate 2 are about L/2, respectively.

Therefore, the construction of a convolver, as indicated in FIG. 8, may be conceivable. In FIG. 8, two convolvers, each of which has a gate length of L, are used and each of the outputs thereof are inputted to the hybrid. In this way, it is possible to obtain a BT product equivalent to that of a convolver, whose gate length is twice as long as that indicated in FIG. 7.

However, there is a problem in this construction of the convolver. FIG. 9 indicates the ideal cooperating mode of the convolver having the construction indicated in FIG. 8. S1~S4 show correlation spike waveforms of the outputs $O'_1$ and $O'_2$ of the two convolvers. S1, S2 and S3 have a same amplitude and a same phase. However, S4 has the same amplitude, but its phase is inversed. S5 and S6 are outputs of the hybrid 4 and the following relations are valid:

$$S5 = S1 + S3 \qquad (1)$$

$$S6 = S2 - S4 \qquad (2)$$

at the output $O_1$, since $$S2 + S4 = 0 \qquad (3)$$

for the region indicated by B there appears no output. On the other hand, at the output $O_2$, since $$S1 - S3 = 0 \qquad (4)$$

there appears no output for the region indicated by A.

The output $O_1$ represents data of "1", while the output $O_2$ represents data of "0". In this case, if the characteristics of the convolver $4_1$ are not identical to those of the convolver $4_2$ and the amplitude and the phase of the outputs are not as indicated in FIG. 9, deterioration phenomena that the amplitude of S5 of the output $O_1$ or that of S6 of the output $O_2$ may be reduced, or a correlation spike may appear at the region indicated by B for the output $O_1$ or at the region indicated by A for the output $O_2$ are produced, which makes the judgment difficult. Further, even if the amplitude and the phase are adjusted, when variations in characteristics of the convolver due to temperature variations are taken into account, the adjustment is not easy.

OBJECT OF THE INVENTION

It is therefore an object of the invention to provide a construction, which is not influenced by unevenness in the characteristics of the convolvers, in a receiver for SSC correlating a received signal with a reference signal provided with the receiver so as to decode it into data by means of two convolvers (correlators).

SUMMARY OF THE INVENTION

In order to achieve the above object, this invention is characterized in that two convolvers are so constructed that a first and a second reference signal, each of which consists of a 4-phase-modulated signal formed on the basis of a first PN code, a second PN code and a first CW signal, are supplied to a second input of each of the convolvers, respectively, while a received signal is supplied to a first input of each of the convolvers.

The received signal is correlated with the first and the second reference signals by the two convolvers, respectively, and information is obtained by decoding their correlation outputs. Since the decoding by the convolvers so as to obtain data is effected by internal operations therein in this case, unevenness in the characteristics of the convolvers gives rise to no problem.

DETAILED DESCRIPTION

Figure 1:
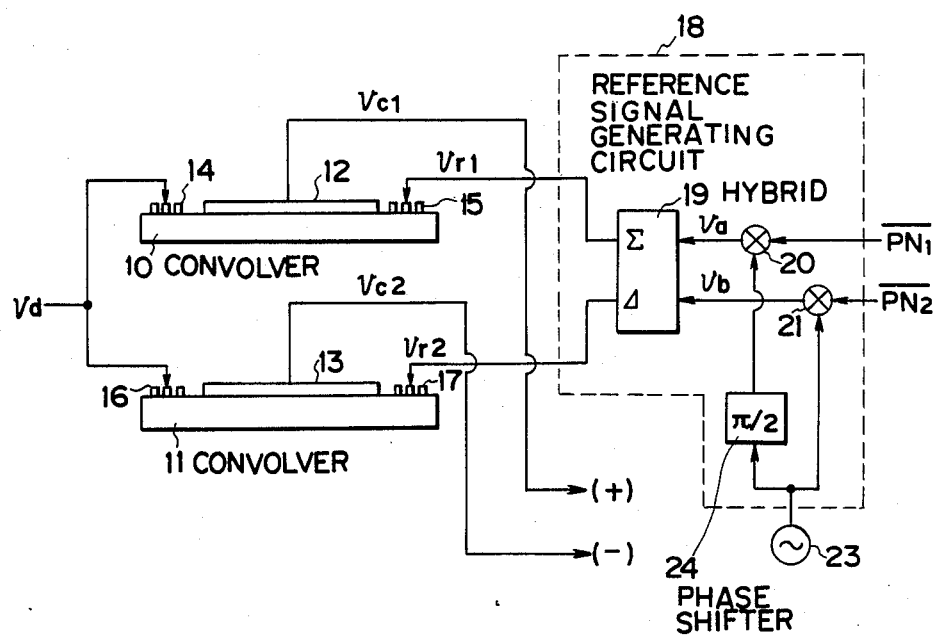
FIG. 1 is a block diagram illustrating the construction of an embodiment of this invention.

Hereinbelow this invention will be explained, referring to the embodiments indicated in the drawings. FIG. 1 indicates an embodiment of the convolver system in a receiver for SSC according to this invention, in which reference numerals 10 and 11 are convolvers; 12 and 13 are gate electrodes; 14 to 17 are input transducers; and 18 is a reference signal generating circuit. The reference signal generating circuit 18 consists of e.g. a hybrid 19, a first and a second multiplier 20, 21, a CW signal generator 23 and a phase shifter 24.

A first PN code $\overline{PN1}$ is supplied directly to the first multiplier 20 and the CW signal is supplied thereto through the phase shifter 24, while a second PN code $\overline{PN2}$ and the CW signal are supplied to the second multiplier 21. The outputs $v_a$ and $v_b$ of the first and the second multipliers 20 and 21 are inputted to the hybrid 19 and the outputs $v_{r1}$ and $v_{r2}$ thereof are supplied to the second transducers 15 and 17 of the convolvers 10 and 11, respectively.

Convolution output signals $v_{c1}$ and $v_{c2}$ are taken out from the gate electrodes 12 and 13 of the convolvers 10 and 11, respectively, and a received signal $v_d$ is supplied to the first input transducers 14 and 16 of the convolvers.

Figure 2:
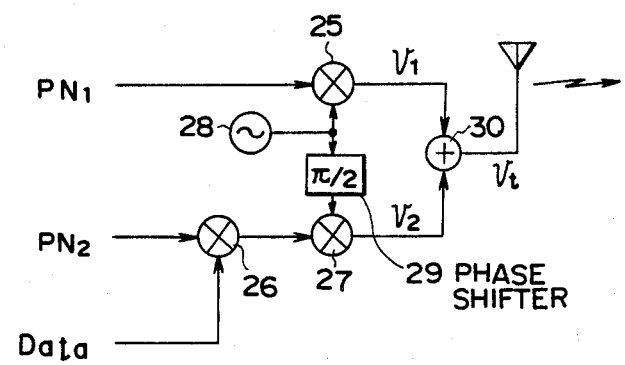
FIG. 2 is a block diagram illustrating an example of the basic construction of a transmitter for SSC corresponding to the embodiment indicated in FIG. 1.

FIG. 2 shows the basic construction of a transmitter for SSC corresponding to the receiver indicated in FIG. 1, in which reference numerals 25 to 27 are multipliers; 28 is a CW signal generator; 29 is a phase shifter and 30 is an adder.

The first PN code PN1 and the CW signal are given to the multiplier 25, while the second PN code PN2 and data to be transmitted Data are given to the multiplier 26. The CW signal is given to the multiplier 27 through the phase shifter 29 and the output of the multiplier 26 is given thereto. The outputs $v_1$ and $v_2$ of the multiplier 25 and 27 are added by the adder 30, whose output $v_t$ is transmitted.

In the transmitter indicated in FIG. 2, the first and the second PN codes PN1 and PN2 as well as the data Data are two-valued data, which are either "1" or "−1". Represent the frequency of the CW signal by $\omega_o$, then $$v_1 = PN_1(t) \cdot \sin(\omega_o t) \tag{5}$$

$$v_2 = A \cdot PN_2(t) \cdot \cos(\omega_o t) \tag{6}$$

where A indicates the data. Consequently, the transmitted signal $v_t$ can be expressed by:

$$\begin{aligned} v_t &= v_1 + v_2 \\ &= PN_1(t) \cdot \sin(\omega_o t) + A \cdot PN_2(t) \cdot \cos(\omega_o t) \end{aligned} \tag{7}$$

The signal given by Equation (7) is a 4-phase-modulated signal.

Figure 3:
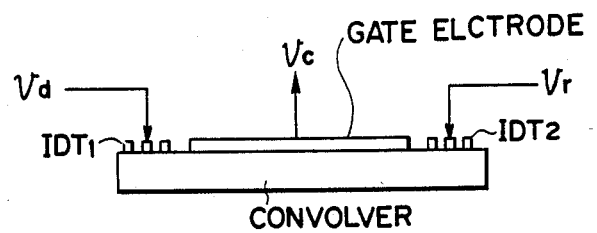
FIG. 3 is a side view of an example of the convolver.

The receiver will be explained. For the explanation, at first the operating mode of the convolvers will be explained, referring to FIG. 3. Represent the signals given to the input transducers IDT1 and IDT2 by $v_d$ and $v_r$, respectively, i.e.

$$v_d = \sin(\omega_o t + \theta_d) \tag{8}$$

$$v_r = \cos(\omega_o t + \theta_r) \tag{9}$$

Defining the convolution operation effected by the convolver by:

$$v_c = \int_{\tau_a}^{\tau_b} v_d \cdot v_r(\tau - t) d\tau \equiv CONV\{v_d \cdot v_r\} \tag{9'}$$

the following equation is valid:

$$\begin{aligned} v_c &= CONV\{v_d, v_r\} \\ &= \eta \sin(2\omega_o t + \theta_d + \theta_r + \phi) \end{aligned} \tag{10} \tag{11}$$

where $\phi$ in Equation (11) indicates an additional phase, which is proper to the convolver, and $\eta$ the convolution efficiency. That is, when two input signals $v_d$ and $v_r$ having a same frequency, the frequency of the output of the convolver is twice as high as that frequency. Further, the phases of the input signals are added to each other and appear in the output together with the additional phase $\phi$, which is proper to the convolver. In FIG. 1, $\overline{PN1}$ and $\overline{PN2}$ are PN codes, which are minor (time-inverted) images of PN1 and PN2, respectively. The CW signal has the same frequency as that used on the transmitter side. $v_a$ and $v_b$ are given by:

$$va = \overline{PN_1}(t) \cdot \cos(\omega_o t + \psi) \tag{12}$$

$$vb = \overline{PN_2}(t) \cdot \sin(\omega_o t + \psi) \tag{13}$$

where $\psi$ indicates a phase difference between the transmitted and the received carriers.

Consequently, the addition output $v_{r1}$ and the subtraction output $v_{r2}$ of the hybrid 19 are as follows:

$$\begin{aligned} v_{r1} &= va + vb \\ &= \overline{PN_1}(t) \cdot \cos(\omega_o t + \psi) \\ &+ \overline{PN_2}(t) \cdot \sin(\omega_o t + \psi) \end{aligned} \tag{14}$$

$$\begin{aligned} v_{r2} &= va + vb \\ &= \overline{PN_1}(t) \cdot \cos(\omega_o t + \psi) \\ &- \overline{PN_2}(t) \cdot \sin(\omega_o t + \psi) \end{aligned} \tag{15}$$

$v_{r1}$ and $v_{r2}$ are 4-phase-modulated signals. The received signal $v_d$ is an attenuated, transmitted signal $v_t$, which is given by:

$$v_d = B \cdot v_t \quad (16)$$

where B is an attenuation coefficient.

The convolvers 10 and 11 correlate $v_d$ with $V_{r1}$ and $v_{r2}$ and using Equations (10), (14) and (15), the respective convolution outputs $v_{c1}$ and $v_{c2}$ are expressed by:

$$v_{c1} = CONV\{v_d, v_{r1}\} \quad (17)$$
$$= CONV\{v_d, v_a + v_b\}$$
$$v_{c2} = CONV\{v_d, v_a - v_b\} \quad (18)$$

Here $CONV\{v_d, v_a \pm v_b\} = CONV\{B \cdot [PN_1(t) \cdot \sin(\omega_0 t) + A \cdot PN_2(t) \cdot \cos(\omega_0 t)], \overline{PN_1}(t) \cdot \cos(\omega_0 t + \psi) \pm \overline{PN_2}(t) \cdot \sin(\omega_0 t + \psi)\} = CONV\{B \cdot PN_1(t) \cdot \sin(\omega_0 t), \overline{PN_1}(t) \cdot \cos(\omega_0 t + \psi)\} + CONV\{A \cdot B \cdot PN_2(t) \cdot \cos(\omega_0 t), \pm\overline{PN_2}(t) \cdot \sin(\omega_0 t + \psi)\} + CONV\{B \cdot PN_1(t) \cdot \sin(\omega_0 t), \pm\overline{PN_2}(t) \cdot \sin(\omega_0 t + \psi)\} + CONV\{A \cdot B \cdot PN_2(t) \cdot \cos(\omega_0 t), \overline{PN_1}(t) \cdot \cos(\omega_0 t + \psi)\} \quad (19)$$

Among the four convolution terms in Equation (19), the third and the fourth terms represent convolutions of PN1 with $\overline{PN2}$ and PN2 with $\overline{PN1}$, respectively, which are mutual correlation values. Since PN codes having an originally small mutual correlation value are chosen, these terms are negligibly small. Consequently, $$CONV\{v_d, v_a \pm v_b\} \approx CONV\{B \cdot PN_1(t) \cdot \sin(\omega_0 t), \overline{PN_1}(t) \cdot \cos(\omega_0 t + \psi)\} + CONV\{A \cdot B \cdot \overline{PN_2}(t)\cos(\omega_0 t), \pm PN_2(t) \cdot \sin(\omega_0 t + \psi)\} \quad (20)$$

is valid. As the result $v_{c1}$ is given by:

$$v_{c1} = \eta_1 \cdot B \cdot R_1(t) \cdot \sin(2\omega_0 t + \psi + \phi_1) + A \cdot R_2(t) \cdot \sin(2\omega_0 t + \psi + \phi_1) \quad (21)$$

Figure 9:
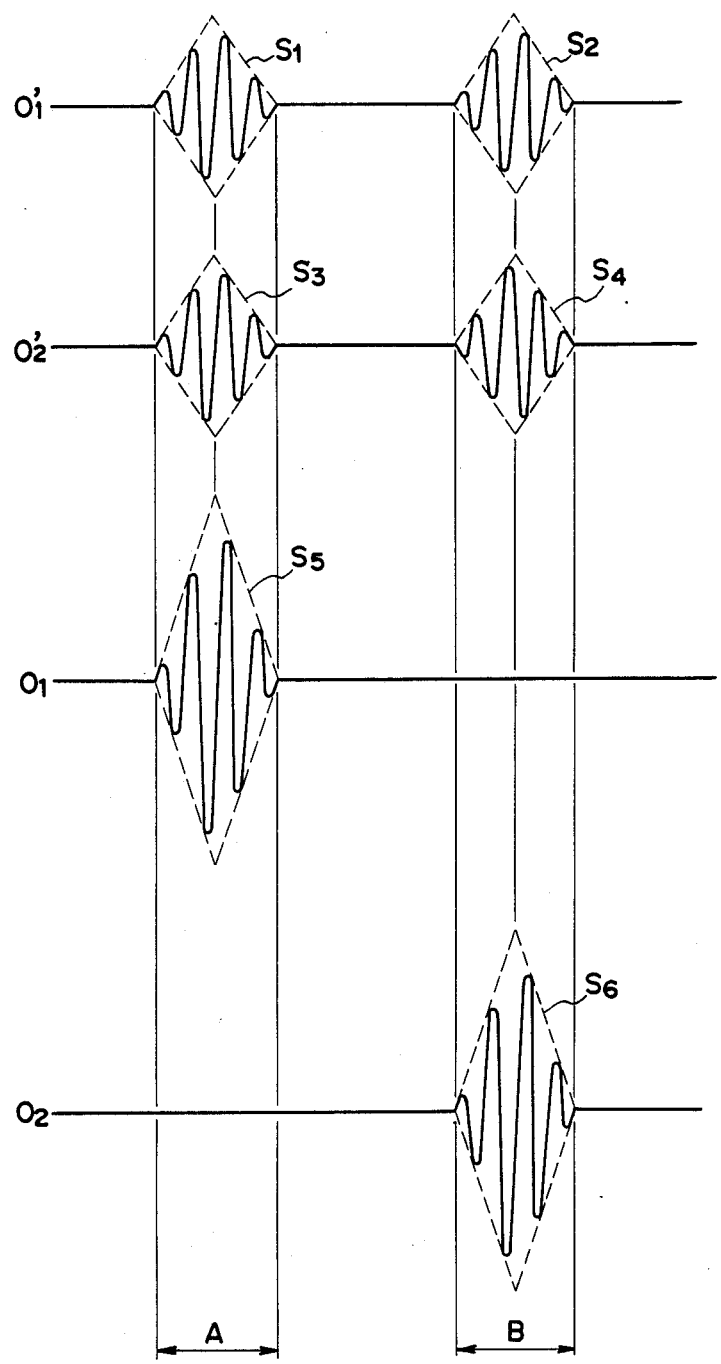
FIG. 9 indicates correlation waveforms in these convolver systems.

Here, $R_1(t)$ and $R_2(t)$ are self-correlation functions of PN1 and PN2, respectively, and envelopes S1 to S4 indicated in FIG. 9, which can be given by:

$$R_1(t) \approx R_2(t) = R(t) \quad (22)$$

Consequently, the following equation is valid:

$$v_{c1} = \eta_1 \cdot B \cdot R(t) \cdot (1+A) \cdot \sin(2\omega_0 t + \psi + \psi_1) \quad (23)$$

and in the same way, $v_{c2}$ is given by:

$$v_{c2} = \eta_2 \cdot B \cdot R(t) \cdot (1-A) \cdot \sin(2\omega_0 t + \psi + \psi_2) \quad (24)$$

from which, if $A=1$, $$\left.\begin{array}{l}v_{c1} = 2 \cdot \eta_1 \cdot B \cdot R(t) \cdot \sin(2\omega_0 t + \psi + \phi_1) \\ v_{c2} = 0\end{array}\right\} \quad (25)$$

and if $A = -1$, $$\left.\begin{array}{l}v_{c1} = 0 \\ v_{c2} = -2 \cdot \eta_2 \cdot B \cdot R(t) \cdot \sin(2\omega_0 t + \psi + \phi_2)\end{array}\right\} \quad (26)$$

$v_{c1}$ and $v_{c2}$ are equal to the outputs $O_1$ and $O_2$ indicated in FIG. 9, respectively, which means that decoding into data is possible, and it is clear that the additional phases $\phi_1$ and $\phi_2$ as well as the efficiencies $\eta_1$ and $\eta_2$, which are inherent to the convolvers, have no influences on the decoding into data. In short, in the convolver system according to this invention, since decoding into data is not effected by sum nor the difference of the outputs of two convolvers, but is effected by internal operations within the convolvers, unevenness in the characteristics of the convolvers gives rise to no problems.

Figure 4:
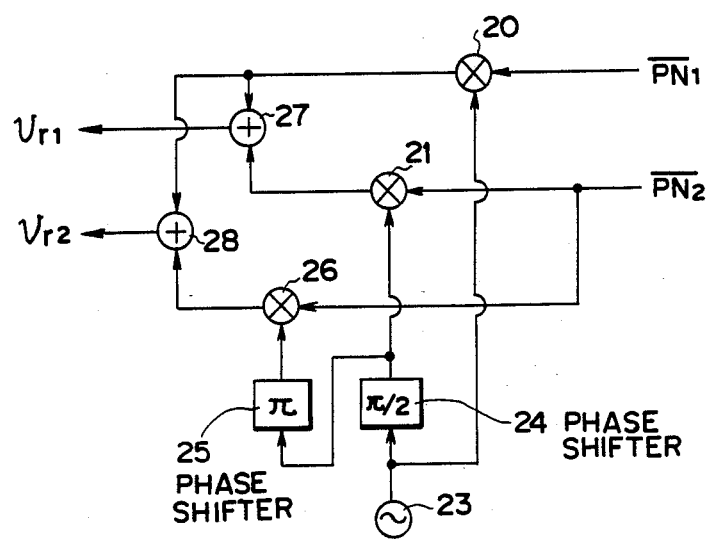
FIG. 4 is a block diagram illustrating the construction of another embodiment of this invention.
Figure 5:
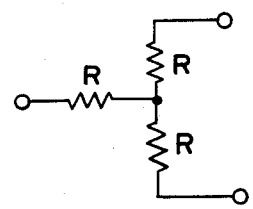
FIG. 5 is a circuit diagram showing an example of the adder used in the embodiment indicated in FIG. 4.
Figure 6:
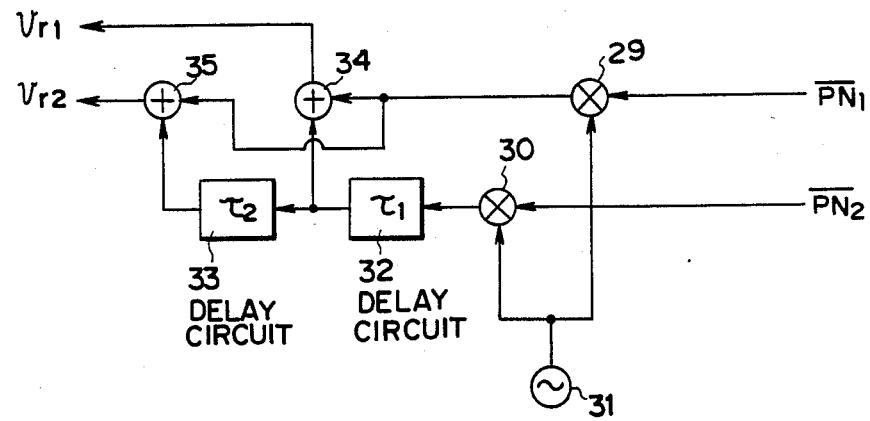
FIG. 6 is a block diagram illustrating the construction of still another embodiment of this invention.
Figure 7:
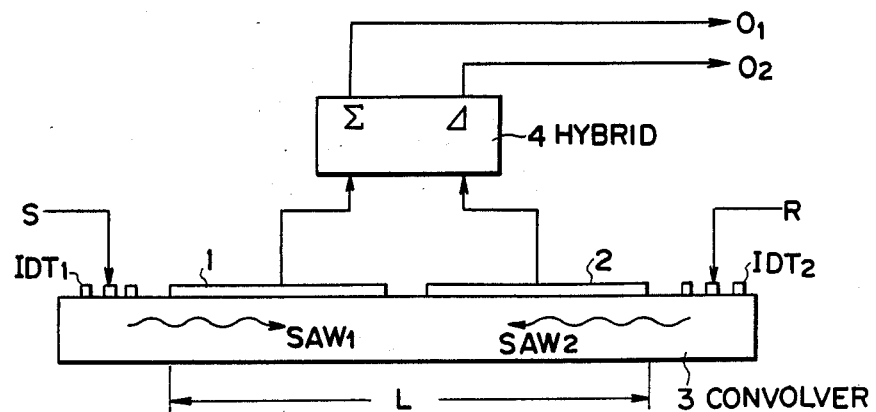
FIGS. 7 and 8 are block diagrams showing convolver systems in prior art receivers for SSC.
Figure 8:
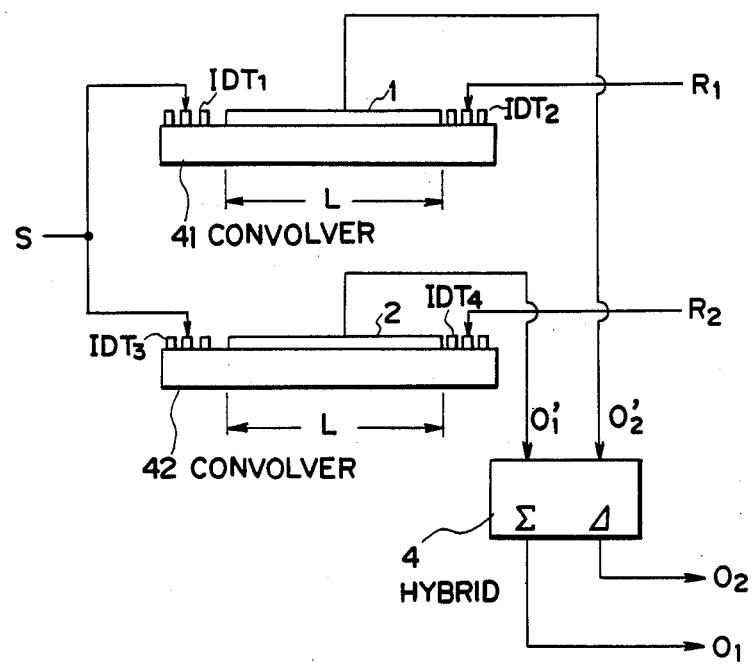

The reference signal generating circuit indicated in FIG. 6 can be constructed only by the adders 27 and 28 instead of the hybrid by adding newly a phase shifter 25 and a multiplier 26, as indicated in FIG. 4. The adder in this case can be constructed simply by a resistor R, as indicated in FIG. 5, which is efficient for reducing the cost.

Further, representing the clock period of the PN code by T1 and the period of the CW signal by T2, if $$T_1 \gg T_2 \quad (27)$$

it is possible to expect a substantially same operation stated above, when the reference signal generating circuit of FIG. 1 is composed of two multipliers 29 and 30, a CW signal generator 31, delay circuits 32 and 33 and adders 34 and 35, as indicated in FIG. 6 and the delay times $\tau_1$ and $\tau_2$ are defined as:

$$\left.\begin{array}{l}\tau_1 = T_1/4 \\ \tau_2 = T_1/2\end{array}\right\} \quad (28)$$

Since, in this case, the number of necessary multipliers is only two and the delay circuits can be realized by determining suitably the length of wiring for the convolvers, this construction is efficient for reducing the cost.

Furthermore, the amount of phase shift of the CW signal in the receiver in the above explanation depends on the transmitter and it is necessary that the amount of phase shift in the phase shifter in FIG. 1 is $-\pi/2$, when that in the phase shifter in FIG. 2 is $-\pi/2$.

As it is clear from the above explanation, according to this invention, since two convolvers are used in a receiver, it is possible to obtain a BT product, which is equivalent to that obtained by using a convolver, whose gate length is doubled, and further the receive is not influenced by unevenness in the characteristics of the two convolvers and in addition, it has a simple circuit construction, which is efficient for reducing the cost.

What is claimed is:

1. A receiver for spread spectrum communication for decoding into information by first and second correlation outputs, comprising:
    reference signal generating means for generating first and second reference signals, each of which is a 4-phase-modulated signal formed on the basis of a first PN code, a second PN code and a first CW signal;

a first convolver for producing the first correlation output from a received spread spectrum signal and the first reference signal which are respectively applied to first and second inputs thereof; and a second convolver for producing the second correlation output from the received spread spectrum signal and the second reference signal which are respectively applied to first and second inputs thereof;

wherein said reference signal generating means includes a first multiplier for multiplying said first PN code and said first CW signal, a second multiplier for multiplying said second PN code and a second CW signal whose phase is shifted by 90° or −90° with respect to said first CW signal, and operating means for adding the output of said first multiplier and that of said second multiplier and for determining the difference therebetween, the output obtained by adding them being said first reference signal, and the result of determining the difference being said second reference signal.

2. A receiver for spread spectrum communication according to claim 1, wherein said operating means includes an adder and a subtractor.

3. A receiver for spread spectrum communication according to claim 1, wherein said operating means includes a hybrid.

4. A receiver for spread spectrum communication for decoding into information by first and second correlation outputs, comprising:

reference signal generating means for generating first and second reference signals, each of which is a 4-phase-modulated signal formed on the basis of a first PN code, a second PN code and a first CW signal;

a first convolver for producing the first correlation output from a received spread spectrum signal and the first reference signal which are respectively applied to first and second inputs thereof; and a second convolver for producing the second correlation output from the received spread spectrum signal and the second reference signal which are respectively applied to first and second inputs thereof;

wherein said reference signal generating means includes a first multiplier for multiplying said first PN code and said first CW signal, a second multiplier for multiplying said second PN code and a second CW signal whose phase is shifted by 90° or −90° with respect to said first CW signal, a third multiplier for multiplying said second PN code and a third CW signal whose phase is shifted by 180° or −180° with respect to said second CW signal, a first adder for adding the output of said first multiplier and that of said second multiplier, and a second adder for adding the output of said first multiplier and that of said third multiplier, the outputs of said first and said second adders being said first and said second reference signals, respectively.

5. A receiver for spread spectrum communication for decoding into information by first and second correlation outputs, comprising:

reference signal generating means for generating first and second reference signals, each of which is a 4-phase-modulated signal formed on the basis of a first PN code, a second PN code and a first CW signal;

a first convolver for producing the first correlation output from a received spread spectrum signal and the first reference signal which are respectively applied to first and second inputs thereof; and a second convolver for producing the second correlation output from the received spread spectrum signal and the second reference signal which are respectively applied to first and second inputs thereof;

wherein said reference signal generating means includes a first multiplier for multiplying said first PN code and said first CW signal, a second multiplier for multiplying said second PN code and said first CW signal, first and second delaying means for delaying the output of said second multiplier, a first adder for adding the output of said first multiplier and that of said first delaying means, and a second adder for adding the output of said first multiplier and that of said second delaying means, the outputs of said first and said second adders being said first and said second reference signals, respectively.

6. A receiver for spread spectrum communication according to claim 5, wherein said first delaying means has an amount of delay corresponding to a shift in the phase of said first CW signal of 90° or −90°, and said second delaying means has an amount of delay corresponding to a shift of 180° of the phase of said first CW signal.

7. A receiver for spread spectrum communication, comprising:

a first convolver having first and second inputs and an output;

a second convolver having first and second inputs and an output;

reference signal generating means for generating a first reference signal $\overline{PN_1(t)} \cdot \cos(\omega_0 t + \psi) + \overline{PN_2(t)} \cdot \sin(\omega_0 t + \psi)$ and a second reference signal $\overline{PN_1(t)} \cdot \cos(\omega_0 t + \psi) - \overline{PN_2(t)} \cdot \sin(\omega_0 t + \psi)$, where $\overline{PN_1(t)}$ is a first pseudo-noise code, $PN_2(t)$ is a second pseudo-noise code, and $\omega_0$ and $\phi$ are respectively the frequency of a first CW signal and a phase;

first means for supplying a received spread spectrum signal to said first input of each of said first and second convolvers; and second means for supplying each of said first and second reference signals to the second input of a respective one of said first and second convolvers.

8. A receiver for spread spectrum communication according to claim 7, wherein said reference signal generating means includes a first multiplier for multiplying said first pseudo-noise code and said first CW signal, a second multiplier for multiplying said second pseudo-noise code and a second CW signal whose phase is shifted by 90° or −90° with respect to said first CW signal, and operating means for determining the sum of the output of said first multiplier and the output of said second multiplier and for determining the difference therebetween, said sum being said first reference signal and said difference being said second reference signal.

9. A receiver for spread spectrum communication according to claim 8, wherein said operating means includes an adder and a subtractor.

10. A receiver for spread spectrum communication according to claim 8, wherein said operating means includes a hybrid.

11. A receiver for spread spectrum communication according to claim 7, wherein said reference signal generating means includes a first multiplier for multiplying said first pseudo-noise code and said first CW signal, a second multiplier for multiplying said second PN code and a second CW signal whose phase is shifted by 90° or −90° with respect to said first CW signal, a third multiplier for multiplying said second pseudo-noise code and a third CW signal whose phase is shifted by 180° or −180° with respect to said second CW signal, a first adder for adding the output of said first multiplier and that of said second multiplier, and a second adder for adding the output of said first multiplier and that of said third multiplier, the outputs of said first and said second adders being said first and said second reference signals, respectively.

12. A receiver for spread spectrum communication according to claim 7, wherein said reference signal generating means includes a first multiplier for multiplying said first pseudo-noise code and said first CW signal, a second multiplier for multiplying said second pseudo-noise code and said first CW signal, first and second delaying means for delaying the output of said second multiplier, a first adder for adding the output of said first multiplier and that of said first delaying means, and a second adder for adding the output of said first multiplier and that of said second delaying means, the outputs of said first and said second adders being said first and said second reference signals, respectively.

13. A receiver for spread spectrum communication according to claim 12, wherein said first delaying means has an amount of delay corresponding to a shift in the phase of said first CW signal of 90° or −90°, and said second delaying means has an amount of delay corresponding to a shift of 180° of the phase of said first CW signal.

* * * * *

UNITED STATES PATENT AND TRADEMARK OFFICE
CERTIFICATE OF CORRECTION

PATENT NO. : 4,908,837

DATED : March 13, 1990

INVENTOR(S) : Masaharu MORI et al

It is certified that error appears in the above-identified patent and that said Letters Patent is hereby corrected as shown below:

Column 8, line 36; change "$\overline{PN_1}(t) \cdot \cos$" to ---$\overline{PN_1(t)} \cdot \cos$---.

line 39; change "$PN_2(t)$" to ---$\overline{PN_2(t)}$---.

line 40; change "$\phi$" to ---$\psi$---.

Signed and Sealed this

Seventeenth Day of September, 1991

*Attest:*

HARRY F. MANBECK, JR.

*Attesting Officer*       *Commissioner of Patents and Trademarks*